United States Patent
Hsu et al.

(10) Patent No.: US 8,908,956 B2
(45) Date of Patent: Dec. 9, 2014

(54) METHOD FOR INSPECTING SURFACE DEFECT OF METAL BALLS BY IMAGE RECOGNITION

(71) Applicants: Ya-Chen Hsu, Taichung County (TW); Fang-Chih Tien, Taichung County (TW)

(72) Inventors: Ya-Chen Hsu, Taichung County (TW); Fang-Chih Tien, Taichung County (TW)

(*) Notice: Subject to any disclaimer, the term of this patent is extended or adjusted under 35 U.S.C. 154(b) by 127 days.

(21) Appl. No.: 13/862,582

(22) Filed: Apr. 15, 2013

(65) Prior Publication Data

US 2013/0230231 A1 Sep. 5, 2013

Related U.S. Application Data

(63) Continuation-in-part of application No. 12/905,037, filed on Oct. 14, 2010, now abandoned.

(51) Int. Cl.
*G06K 9/00* (2006.01)
*G06T 7/00* (2006.01)

(52) U.S. Cl.
CPC ............... *G06T 7/0004* (2013.01); *G06T 7/001* (2013.01); *G06T 2207/30108* (2013.01)

USPC .......................................................... 382/141

(58) Field of Classification Search
USPC .................................... 382/141–152, 168, 172
See application file for complete search history.

(56) References Cited

U.S. PATENT DOCUMENTS 6,825,931 B2 * 11/2004 Welchman et al. ............ 356/394
7,113,273 B2 * 9/2006 Pahk et al. ................. 356/237.1

* cited by examiner

*Primary Examiner* — Brian Le
(74) *Attorney, Agent, or Firm* — Banger Shia

(57) ABSTRACT

A method for inspecting surface defect of metal balls by image recognition includes the steps of feeding metal ball, capturing image for a first time, making metal ball rotate, capturing image for a second time, comparing images, and discharging metal balls. With the above steps, not only can the metal balls be sorted into the acceptable and the unacceptable metal balls, but the unacceptable metal balls can be sorted into different kinds according to the defects such as scratch, strain, and so on. Hence, effective data can be offered to improve the metal ball manufacturing process accurately.

5 Claims, 3 Drawing Sheets

METHOD FOR INSPECTING SURFACE DEFECT OF METAL BALLS BY IMAGE RECOGNITION

This application is a continuation in part of U.S. patent application Ser. No. 12/905,037, which claims the benefit of the earlier filing date of Oct. 14, 2010. Claims 1, 2, 3 and 4 of this application are revised from claims 1, 2, 4 and 5 of the U.S. patent application Ser. No. 12/905,037, respectively. Claims 5 and 6 of this application are new.

BACKGROUND OF THE INVENTION

1. Field of the Invention

The present invention relates to a method for inspecting surface defect of metal balls, and more particularly to a method for inspecting surface defect of metal balls by image recognition.

2. Description of the Prior Art

A first conventional metal ball roundness sorting machine comprises a feeding apparatus, an inspection apparatus and a dispensing apparatus. The inspection device includes a round disc and a speed controller for controlling the rotation speed of the round disc. The round disc is located under a chute of a feeding box and driven by a DC motor to rotate and includes a stopping plate on an inner side edge thereof, in front of the chute of the feeding box is disposed an obliquity guide plate, and at an inner side of the round disc is further disposed another guide plate. The two guide plates are used to guide the metal balls on the round disc to be inspected and sorted in turn.

A second conventional metal ball sorting machine sorts the metal balls with the following method that a light-emitting unit is used to radiate light on the metal balls to make the metal balls reflect a light to be received by a light received unit, and then the metal balls will be determined whether they have defects by comparing the light intensity for sorting the metal balls. For example, if the intensity difference of a metal ball is higher than a predetermined value, the metal ball surface is determined to have defects.

The above two sorting machines both can sort the metal balls into two kinds: acceptable and unacceptable, but neither can offer effective analysis data to improve the metal ball manufacturing process accurately.

The present invention has arisen to mitigate and/or obviate the afore-described disadvantages.

SUMMARY OF THE INVENTION

The primary objective of the present invention is to provide a method for inspecting surface defect of metal balls by image recognition which can accurately improve the metal ball manufacturing process.

Hence, in order to achieve the above objective, a method for sorting metal balls by image recognition in accordance with the present invention comprises the steps of: feeding metal ball: feeding a metal ball to a conveying apparatus, the conveying apparatus comprising a chassis, a rotary disc made of light-transmitting material rotatably disposed on the chassis, and a light source unit, the rotary disc being formed with plural holes for accommodation of the metal ball, the metal ball having a first surface which is visible from the holes, the light source unit being located at one side of the rotary disc to enable the first surface of the metal ball to produce uniform brightness;

capturing image for a first time: utilizing an image capturing apparatus to capture and store an image of the first surface of the metal ball; and comparing image: comparing the image of the first surface of the metal ball with respect to image data in a database to establish data related to acceptable metal balls, unacceptable metal balls and kinds of the unacceptable metal balls.

Preferably, the metal ball includes at least the first surface and a second surface, the method for sorting metal balls by image recognition further comprises the steps of making metal ball rotate and capturing image for a second time, the chassis includes a rolling groove in communication with the holes of the rotary disc, the rotary disc is allowed to rotate a certain angle, after the metal ball is received in the holes of the rotary disc, a part of the metal ball is exposed out of the tapered hole and brought into contact with the rolling groove, the metal balls are rotated by the conveying apparatus to make the second surface of the metal ball visible from the holes of the rotary disc, a second image capturing apparatus is used to capture and store an image of the second surface of the metal ball in the step of capturing image for a second time, the captured images of the first surface and the second surface are compared with respect to the image data in the database, respectively in the step of comparing image.

Preferably, the method for inspecting surface defect of metal balls by image recognition further comprises a step of discharging metal balls after the step of comparing image, the respective metal balls being controlled to fall in different direction according to a result of the step of comparing image.

Preferably, the first or second surface of the metal ball is located in the tapered holes when the metal ball is received in the holes of the rotary disc.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
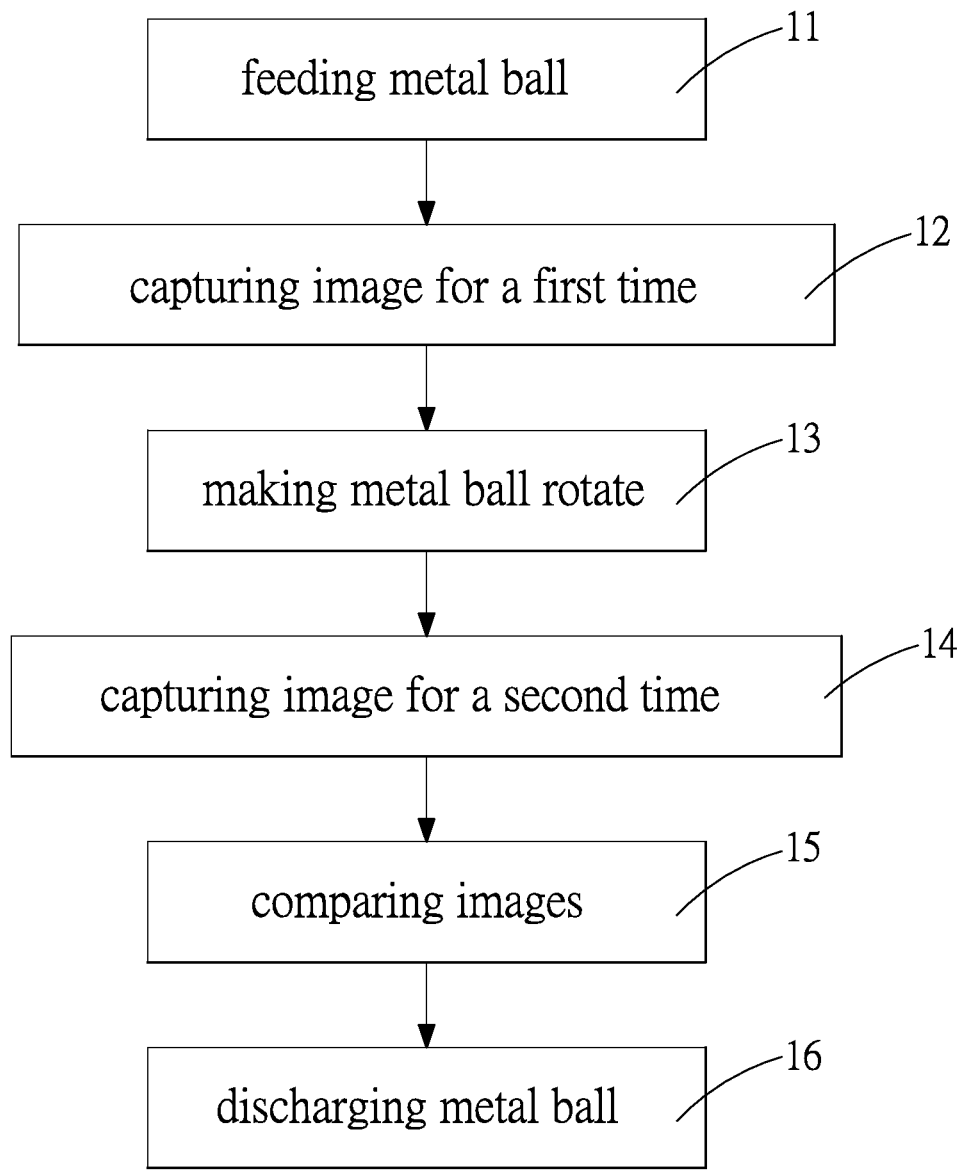
FIG. 1 is a block flow diagram of a method for inspecting surface defect of metal balls by image recognition in accordance with the present invention.

Referring to FIG. 1, a method for inspecting surface defect of metal balls by image recognition in accordance with the present invention comprises the steps of feeding metal ball 11, capturing image for a first time 12, making metal ball rotate 13, capturing image for a second time 14, comparing images 15, and discharging metal ball 16.

Figure 2:
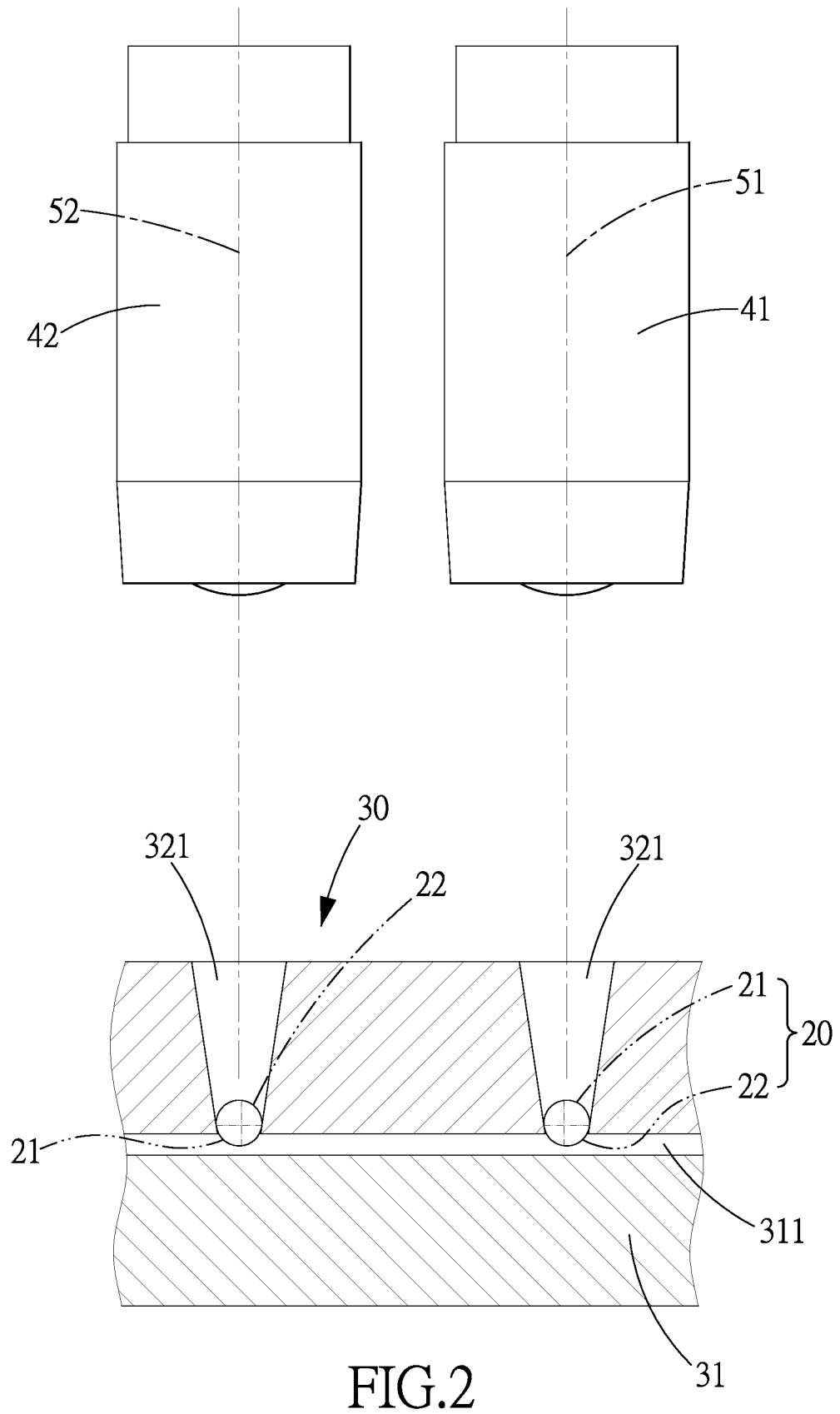
FIG. 2 is a partial view showing the relation between the feeding apparatus, the metal balls and the first, second image capturing apparatus in accordance with the present invention.
Figure 3:
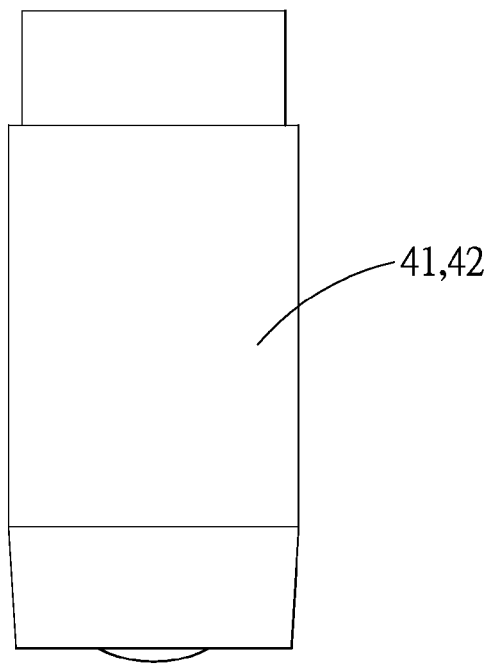
FIG. 3 is another partial view showing two light source units are disposed at two opposite sides of the rotary disc of the conveying apparatus.
Figure 3:
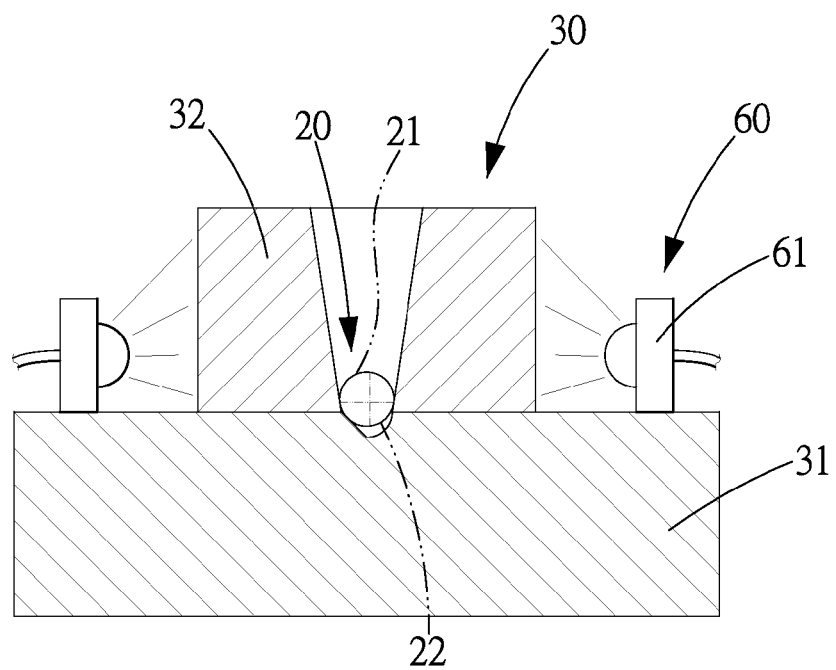

The step of feeding metal ball 11: referring to FIGS. 2 and 3, the metal balls 20 are fed into a conveying apparatus 30. Each of the metal balls 20 includes a first surface 21 which is exposed out and a second surface 22, and the conveying apparatus 30 includes a chassis 31 including a rolling groove 311, a rotary disc 32 made of light-transmitting material rotatably disposed on the chassis 31, and two light source units 60. The rotary disc 32 is allowed to rotate a certain angle and formed with plural circularly-arranged tapered holes 321 which are tapered downwards and in communication with the rolling groove 311. Each of the plural tapered holes 321 is provided for accommodation of a single metal ball 20. The metal ball 20 is accommodated in the corresponding tapered hole 321 in such a manner that part of the metal ball 20 is exposed out of the tapered hole 321 and brought into contact with the rolling groove 311, and the first surface 21 of the metal ball 20 is visible from the tapered hole 321. The light source units 60 are disposed on the chassis 31 and located at two sides of the rotary disc 32. Each of the light source units 60 includes plural light emitting diodes 61 which project light onto the light-transmitting rotary disc 32, making the first surface 21 produce uniform brightness, so as to provide a perfect shooting environment. It is to be noted that, the circularly-arranged tapered holes 321 and the related parts are drawn on FIG. 2 in an unfolded manner for easy comprehension.

The step of capturing image for a first time 12: a first image capturing apparatus 41 is used to capture the image of the first surface 21 of the metal ball 20. The first image capturing apparatus 41 is a normal camera. The first image capturing apparatus 41 is disposed at a first position 51 for capturing and storing the image of the first surface 21 of the metal ball 20. The first position 51 is aligned with the tapered hole 321 of the rotary disc 32, and when the first image capturing apparatus 41 is disposed at the first position 51, the first surface 21 of the metal ball 20 is visible via the tapered hole 321.

The step of making metal ball rotate 13: the metal balls 20 are rotated by the conveying apparatus 30 to make their second surfaces 22 visible from the tapered hole 321. In the present embodiment, the rotary disc 32 of the conveying apparatus 30 is controlled to rotate an angle, and since the metal balls 20 are restricted in the tapered holes 321 of the rotary disc 32, and part of the metal ball 20 contacts the rolling groove 311 of the chassis 31, the rotary disc 32 will drive the metal balls 20 in the tapered holes 321 to roll along the rolling groove 311, making the second surfaces 22 of the metal balls 20 visible from the tapered hole 321.

The step of capturing image for a second time 14: a second image capturing apparatus 42 is used to capture and store the image of the second surface 22 of the metal ball 20. The second image capturing apparatus 42 is a normal camera and disposed at a second position to capture and store the image of the second surface 22 of the metal ball 20. The second position 52 is aligned to the tapered hole 321 of the rotary disc 32 which rotates the angle, and when the second image capturing apparatus 42 is disposed at the second position 52, the second surface 22 of the metal ball 20 is visible from the tapered hole 321.

The step of comparing images 15: the stored images of the first surface 21 and the second surfaces 22 of the metal balls 20 are compared with the image data in the database, respectively to establish the data related to the acceptable metal balls, unacceptable metal balls, and kinds of unacceptable metal balls.

The step of discharging metal balls 16: according to the result from the step of comparing images 15, detecting and classifying the kinds of the metal balls, including acceptable metal balls, unacceptable metal balls with scratch, unacceptable metal balls with strain, and etc, controlling the respective metal balls 20 to fall in different directions.

Hence, the sorting method by image recognition in accordance with the present invention can not only sort the metal balls into two kinds: one is acceptable, and the other is unacceptable but sort the unacceptable metal balls into different kinds according to the kinds of the defects, such as: scratch, strain, and so on. Thereby, it can establish data of the metal balls to offer the effective analysis data to improve the metal ball manufacturing process accurately.

In addition, the present invention can also accurately improve the manufacturing process with the steps of capturing image for a single time and comparing the image with the image data in the database. Of course, capturing the image of the metal ball for more than two times and comparing the images with respect to the image data in the database are also feasible. The more times the image is captured, the more accurate the result of the comparing is.

It is to be noted that the present invention provides a method to inspect surface defect of metal balls by image recognition. In order to produce a perfect shooting environment for shooting the surface of the metal ball 20, when the metal ball 20 is received in the tapered hole 321, the first or second surface 21, 22 visible from the tapered hole 321 must be fully located in the tapered hole 321. Furthermore, in the step of feeding metal ball 11, the light source units 60 are disposed on the chassis 31 and located at two sides of the rotary disc 32, and the rotary disc 32 is made of light transmitting material. When the light of the light source units 60 is projected on the rotary disc 32, the inner surface of the tapered hole 321 of the rotary disc 32 will produce light which will be projected on the first or second surface 21, 22, making the first surface 21 produce uniform brightness, so that the first and the second image capturing apparatuses 41, 42 can capture the images of the first and the second surfaces 21, 22 more clearly.

While we have shown and described various embodiments in accordance with the present invention, it is clear to those skilled in the art that further embodiments may be made without departing from the scope of the present invention.

What is claimed is:

1. A method for inspecting surface defect of metal balls by image recognition comprising the steps of:

feeding metal ball: feeding a metal ball to a conveying apparatus, the conveying apparatus comprising a chassis, a rotary disc made of light-transmitting material rotatably disposed on the chassis, and a light source unit, the rotary disc being formed with plural holes for accommodation of the metal ball, the metal ball having a first surface which is visible from the holes, the light source unit being located at one side of the rotary disc to enable the first surface of the metal ball to produce uniform brightness;

capturing image for a first time: utilizing an image capturing apparatus to capture and store an image of the first surface of the metal ball; and comparing image: comparing the image of the first surface of the metal ball with respect to image data in a database to establish data related to acceptable metal balls, unacceptable metal balls and kinds of the unacceptable metal balls.

2. The method for inspecting surface defect of metal balls by image recognition as claimed in claim 1, wherein the metal ball includes at least the first surface and a second surface, the method for sorting metal balls by image recognition further comprises the steps of making metal ball rotate and capturing image for a second time, the chassis includes a rolling groove in communication with the holes of the rotary disc, the rotary disc is allowed to rotate a certain angle, after the metal ball is received in the holes of the rotary disc, a part of the metal ball is exposed out of the tapered hole and brought into contact with the rolling groove, the metal balls are rotated by the conveying apparatus to make the second surface of the metal ball visible from the holes of the rotary disc, a second image capturing apparatus is used to capture and store an image of the second surface of the metal ball in the step of capturing image for a second time, the captured images of the first surface and the second surface are compared with respect to the image data in the database, respectively in the step of comparing image.

3. The method for inspecting surface defect of metal balls by image recognition as claimed in claim 1 further comprising a step of discharging metal balls after the step of comparing image, the respective metal balls being controlled to fall in different direction according to a result of the step of comparing image.

4. The method for inspecting surface defect of metal balls by image recognition as claimed in claim 2 further comprising the step of discharging metal balls after the step of comparing image, the respective metal balls being controlled to fall in different direction according to a result of the step of comparing image.

5. The method for inspecting surface defect of metal balls by image recognition as claimed in claim 2, wherein the first or second surface of the metal ball is located in the tapered holes when the metal ball is received in the holes of the rotary disc.

\* \* \* \* \*